United States Patent
Saitou et al.

(10) Patent No.: US 6,860,830 B2
(45) Date of Patent: Mar. 1, 2005

(54) HYDRAULIC CONTROL DEVICE FOR AUTOMATIC TRANSMISSION

(75) Inventors: Yuuji Saitou, Fuji (JP); Takashi Murasugi, Fuji (JP)

(73) Assignee: JATCO Ltd (JP)

( * ) Notice: Subject to any disclaimer, the term of this patent is extended or adjusted under 35 U.S.C. 154(b) by 25 days.

(21) Appl. No.: 10/253,067

(22) Filed: Sep. 24, 2002

(65) Prior Publication Data

US 2003/0064849 A1 Apr. 3, 2003

(30) Foreign Application Priority Data

Sep. 28, 2001 (JP) .......................................... 2001-302802

(51) Int. Cl.[7] .............................................. F16H 31/00
(52) U.S. Cl. ...................... 475/127; 475/128; 475/116; 475/119; 477/908; 477/158
(58) Field of Search ................. 475/127, 128, 475/116, 119; 477/906, 158; F16H 61/12

(56) References Cited

U.S. PATENT DOCUMENTS 5,938,563 A * 8/1999 Nishio et al. ............... 477/117
6,332,855 B1 * 12/2001 Murasugi .................... 475/128
6,350,214 B1 * 2/2002 Murasugi .................... 475/128
6,478,707 B1 * 11/2002 Jang .......................... 475/119
6,537,170 B2 * 3/2003 Murasugi et al. ........... 475/126
6,540,635 B1 * 4/2003 Sano .......................... 475/120
6,565,474 B2 * 5/2003 Futamura et al. ........... 475/128

* cited by examiner

Primary Examiner—Richard M. Lorence
Assistant Examiner—David D. Le
(74) Attorney, Agent, or Firm—Rossi, Kimms & McDowe

(57) ABSTRACT

There is provided a hydraulic control device for an automatic transmission, which is comprised of an engagement state determining section and a protection control section. If the engagement state determining section determines that each clutch, which is supplied with a line pressure via a regulating valve having a spool and has an oil pressure switch disposed in an oil channel, is held in an engaged state when gears are not changed, the protection control section sets a command pressure for the regulating valve to a protective oil pressure lower than the line pressure. This brings the regulating valve into a pressure-regulating state to cause lands of the spool to form apertures that reduce hydraulic vibration applied to the line pressure. This inhibits an oil pressure beyond an acceptable value from being applied to the oil pressure switch, and therefore improves the durability of the oil pressure switch.

7 Claims, 12 Drawing Sheets

Fig.2

| CLUTCH / Gear Position | L/C | 2-4/B | H/C | L&R/B | R/C |
|---|---|---|---|---|---|
| 1st | O | × | × | × | × |
| 2nd | O | O | × | × | × |
| 3rd | O | × | O | × | × |
| 4th | × | O | O | × | × |
| 5th | × | × | × | O | O |

O Engage
× Disengage

Fig.6

| Gcur | Gsft | Shift Direction | Control of Clutches | | | | |
|---|---|---|---|---|---|---|---|
| | | | L/C | 2-4/B | H/C | L&R/B | |
| 1st Gear Position | 1st | 1st | E(Engage) | D(Disengage) | D | (E) | |
| | 2nd | 1→2 | E | D→E | D | (E→D) | |
| | 3rd | 1→3 | E | D | D→E | (E→D) | |
| | 4th | 1→4 | E→D | D→E | D→E | (E→D) | |
| 2nd Gear Position | 1st | 2→1 | E | E→D | D | D→E | |
| | 2nd | 2nd | E | E | D | D | |
| | 3rd | 2→3 | E | E→D | D→E | D | |
| | 4th | 2→4 | E→D | E | D→E | D | |
| 3rd Gear Position | 1st | 3→1 | E | D | E→D | D→E | |
| | 2nd | 3→2 | E | D→E | E→D | D | |
| | 3rd | 3rd | E | D | E | D | |
| | 4th | 3→4 | E→D | D→E | E | D | |
| 4th Gear Position | 1st | 4→1 | D→E | D→E | E→D | D→E | |
| | 2nd | 4→2 | D→E | E | E→D | D | |
| | 3rd | 4→3 | D→E | E→D | E | D | |
| | 4th | 4th | D | E | E | D | |

HYDRAULIC CONTROL DEVICE FOR AUTOMATIC TRANSMISSION

BACKGROUND OF THE INVENTION

1. Field of the Invention

The present invention relates to a hydraulic control device for an automatic transmission.

2. Description of the Prior Art

An automatic transmission has a transmission mechanism that is comprised of rotational elements such as planetary gear mechanisms and friction elements such as clutches and brakes that engage and disengage the rotational elements. The rotational elements are each-actuated by oil pressure, and engage and disengage the friction elements in predetermined combinations to achieve a plurality of gear positions.

FIG. 11 shows an example in which an oil pressure is supplied to a clutch as a friction element. As shown in FIG. 11, a line pressure supplied from an oil pump, not shown, is regulated by a regulating valve 10 under the control of a solenoid 11 and is then supplied to a clutch 40.

The regulating valve 10 receives a control pressure from the solenoid 11 at one control end thereof, and feeds back an output pressure to the other control end to maintain the output pressure corresponding to the control pressure.

An oil pressure switch 13 is provided in an oil channel 42 between the regulating valve 10 and the clutch 40. The oil pressure switch 13 detects the operational timing of the clutch 40 according to a clutch pressure in the process of oil pressure filling or draining in the cultch 40. Oil pressures between interconnecting friction elements are controlled in the detected operational timing so as to realize quick and smooth gear shift.

If oil pressure is supplied against the intention to drain oil pressure or is drained against the intention to supply oil pressure due to a failure of a hydraulic control device, clutches or brakes are unintendedly engaged or disengaged to be brought into a dangerous state such as an interlocked state or a neutral state. To avoid this problem, the oil pressure switch 13 immediately and accurately detects the supply or drain of the oil pressure.

When gears are not changed after completion of gear shift to a gear position at which the clutch 40 is engaged, the regulating valve 10 receives the control pressure directing the maximum command pressure higher than the line pressure from the solenoid 11, and outputs the output pressure corresponding to the line pressure to the clutch 40 to keep the clutch 40 engaged.

Namely, the line pressure is directly supplied to the clutch 40 without being lowered at all.

As shown in FIGS. 12A and 12B showing the basic construction of the regulating valve 10, a spool 35 is inserted into a valve hole 31 comprised of an input port 32, output port 33, and drain port 34 such that the spool 35 is capable of stroking. The line pressure is supplied to the input port 32, and the output port 33 is in communication with the clutch 40.

In a so-called pressure-regulating state in which the command pressure is lower than the line pressure, a low control pressure (SOL pressure) supplied from the solenoid 11 causes a land 36 of the spool 35 to close the input port 32 and form an aperture S1 by a gap between the land 36 and the valve hole 31 and causes a land 37 of the spool 35 to close the drain port 34 and form an aperture S2 by a gap between the land 37 and the valve hole 31 as shown in FIG. 12A. Oil leaked through the aperture S1 raises the oil pressure at the output port 33, and oil leaked through the aperture S2 lowers the oil pressure at the output port 33.

If the oil pressure at the output port 33, which is formed according to balance between the oil leaked through the aperture S1 and the oil leaked through the aperture S2, is higher than the oil pressure corresponding to the SOL pressure, a feed pressure applied from a lower position to an upper position of the spool 35 in FIG. 12A is raised to cause the spool 35 to stroke upward in FIG. 12A to narrow the aperture S1 and widen the aperture S2.

Consequently, the oil leaked through the aperture S1 is decreased and the oil leaked through the aperture S2 is increased to lower the oil pressure at the output port 33.

On the other hand, if the oil pressure of the output port 33 is lower than the oil pressure corresponding to the SOL pressure, a feed pressure applied from the lower position to the upper position of the spool 35 in FIG. 12A is lowered to cause the spool 35 to stroke downward in FIG. 12A to widen the aperture S1 and narrow the aperture S2.

Consequently, the oil leaked through the aperture S1 is increased and the oil leaked through the aperture S2 is decreased to raise the oil pressure at the output port 33.

By repeating the above-described operation, the oil pressure at the output port 33 becomes closer to the oil pressure corresponding to the SOL pressure, and thus forms the oil pressure corresponding to the SOL pressure.

As described above, if the regulating valve 10 is held in the pressure-regulating state, the oil pressure through the input port 32 is limited by the aperture S1, and if the oil pressure higher than the balanced oil pressure is formed, the oil is discharged through the drain port 34. Therefore, even if there is a great change in the oil pressure at the input port 32, the oil pressure is transmitted to the output port 33 after the change is reduced.

On the other hand, if the command pressure is higher than the line pressure, i.e. the control pressure from the solenoid 11 is high, the input port 32 is completely opened as shown in FIG. 12B without being narrowed by the land 36, and the drain port 34 is almost closed to prevent the oil pressure from leaking through the drain port 34.

Therefore, if hydraulic vibration occurs dependently on the structure of the oil pump, the hydraulic vibration is directly applied to the oil pressure switch 13.

A mean value of the oil pressure is called an effective pressure because the mean value of the oil pressure including the hydraulic vibration actually determines the torque transmissible capacity of the clutch. In the case of high-frequency hydraulic vibration, even if the effective pressure of the oil pressure applied to the clutch 40 is low, the hydraulic vibration causes an instantaneous oil pressure in excess of a pressure acceptable by the oil pressure switch to be directly applied to the oil pressure switch to cause a failure thereof because the oil pressure switch and peripheral hydraulic circuits thereof are configured to have a high responsiveness.

If the high-frequency oil oscillation is applied to the line pressure and the oil pressure at which the amplitude of the hydraulic vibration is the smallest becomes lower than the oil pressure at which the oil pressure switch is turned off, the oil pressure switch is repeatedly turned on and off. However, the number of times the oil pressure switch is accurately turned on and off is limited in terms of durability, and if the number of times exceeds the allowable number of times, the oil pressure switch cannot be accurately turned on or off. The high-frequency hydraulic vibration causes the oil pressure switch to be turned on and off with a high frequency, and thus, the oil pressure is repeatedly turned on and off a large number of times in a short period of time. This considerably deteriorates the durability of the oil pressure switch 13.

SUMMARY OF THE INVENTION

It is therefore an object of the present invention to provide a hydraulic control device for an automatic transmission, which prevents hydraulic vibration applied to line pressure from affecting an oil pressure switch that detects oil pressure of friction elements to thus improve the durability of the oil pressure switch.

To attain the above object, the present invention provides a hydraulic control device for an automatic transmission that comprises a plurality of rotational elements and a plurality of hydraulically actuated friction elements to achieve a plurality of gear positions by engaging or disengaging the friction elements in predetermined combinations, and comprises oil pressure switches in oil supply channels of predetermined friction elements to which is supplied a line pressure via regulating valves, the hydraulic control device comprising: an engagement state determining means for determining whether respective ones of the friction elements are being controlled to be engaged; and a protection control means for bringing the corresponding regulating valves into a pressure-regulating state such that an output from the regulating valves of the friction elements determined as being engaged among the friction elements having the oil pressure switches is kept lower than the line pressure.

Since the regulating valve for each friction element provided with the oil pressure switch is held in the pressure-regulating state in which the output from the regulating valve is kept lower than the line pressure while each friction element is controlled to be engaged, the transmission of the hydraulic vibration applied to the line pressure is limited to prevent a higher pressure resulting from the hydraulic vibration than the effective pressure from being applied to the oil pressure switch.

BRIEF DESCRIPTION OF THE DRAWINGS

FIG. 2 is a table showing the combinations of engaged or disengaged friction elements;

FIG. 6 is a clutch control definition table based on the current gear position and the target shift position;

DETAILED DESCRIPTION OF THE PREFERRED EMBODIMENTS

The present invention will now be described in detail with reference to the drawings showing a preferred embodiment thereof.

Figure 1:
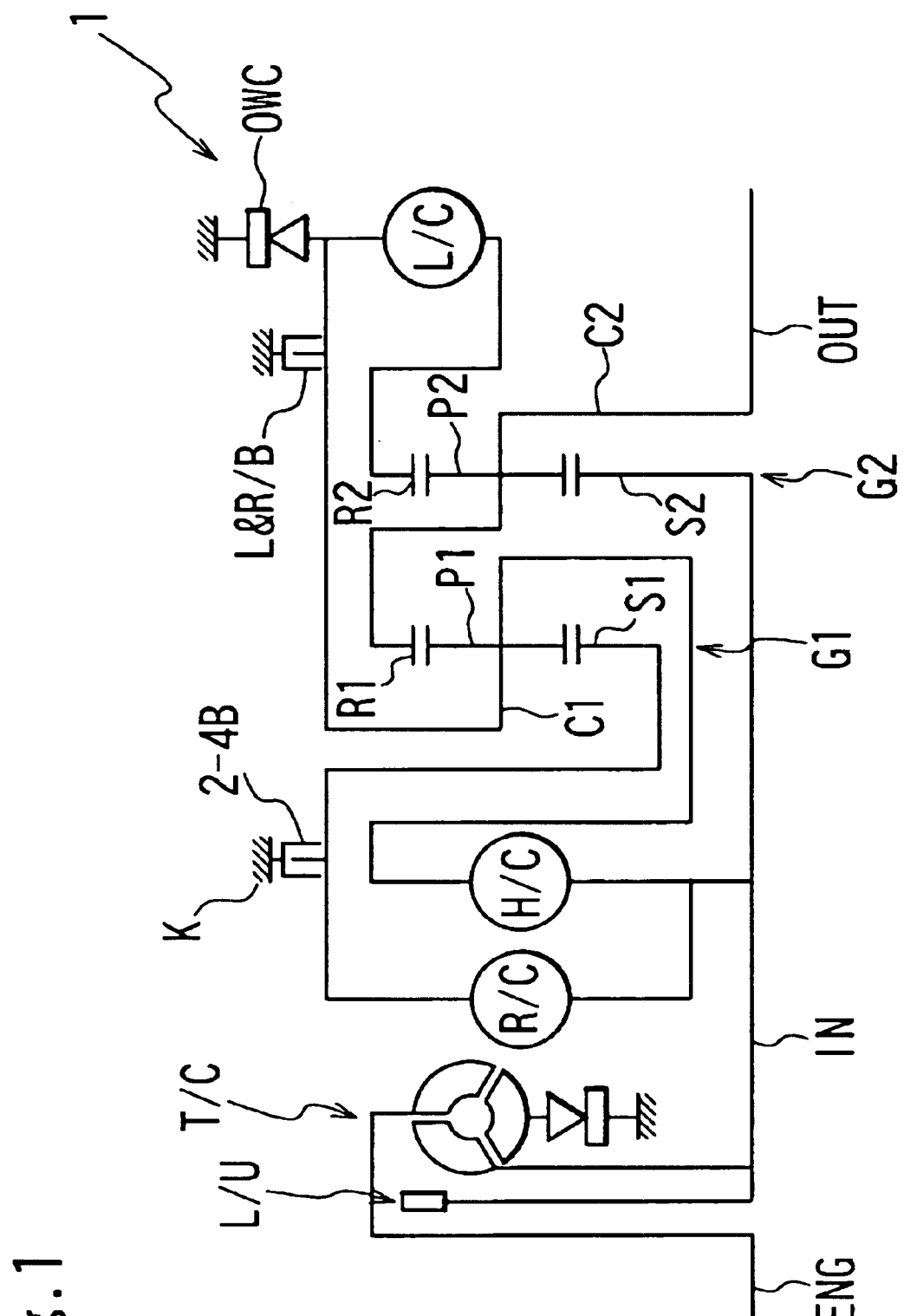
FIG. 1 is a diagram showing a transmission mechanism of an automatic transmission according to an embodiment of the present invention.

FIG. 1 shows an example of a transmission mechanism of an automatic transmission to which is applied a hydraulic control device according to an embodiment of the present invention.

A transmission mechanism 1 is comprised of a first planetary gear mechanism G1 and a second planetary gear mechanism G2, which are arranged on a transmission input shaft IN.

A torque is outputted from an engine output shaft ENG, and is inputted to the transmission input shaft IN via a torque converter T/C. A transmission output shaft OUT is aligned with an extension of the transmission input shaft IN. A lock-up clutch L/U is annexed to the torque converter T/C.

The first planetary gear mechanism G1 is a simple planetary gear mechanism that is comprised of a first pinion P1, first carrier C1, first sun gear S1, and first ring gear R1. The second planetary gear mechanism G2 is a simple planetary gear mechanism that is comprised of a second pinion P2, second carrier C2, second sun gear S2, and second ring gear R2.

The first sun gear S1 in the first planetary gear mechanism G1 is connected to the transmission input shaft IN via a reverse clutch R/C, and is capable of being fixed to a transmission case K by a 2-4 brake 2-4B. The first carrier C1 supporting the first pinion P1 is connected to the transmission input shaft IN via a high clutch H/C. The first carrier C1 is capable of being fixed to the transmission case K by a low-and-reverse brake L&R/B and a one-way clutch OWC, which are arranged in parallel with each other.

The first ring gear R2 is connected to the second carrier C2 in the second planetary gear mechanism G2.

The second sun gear S2 in the second planetary gear mechanism G2 is serially connected to the transmission input shaft IN, and the second carrier C2 in the second planetary gear mechanism G2 is serially connected to the transmission output shaft OUT. The second ring gear R2 is connected to the first carrier C1 in the second planetary gear mechanism G1 via a low clutch L/C.

The above-mentioned clutches and brakes as friction elements are engaged and disengaged in predetermined combinations to achieve four forward-driving gear positions and one rearward driving gear position as shown in FIG. 2.

Figure 3:
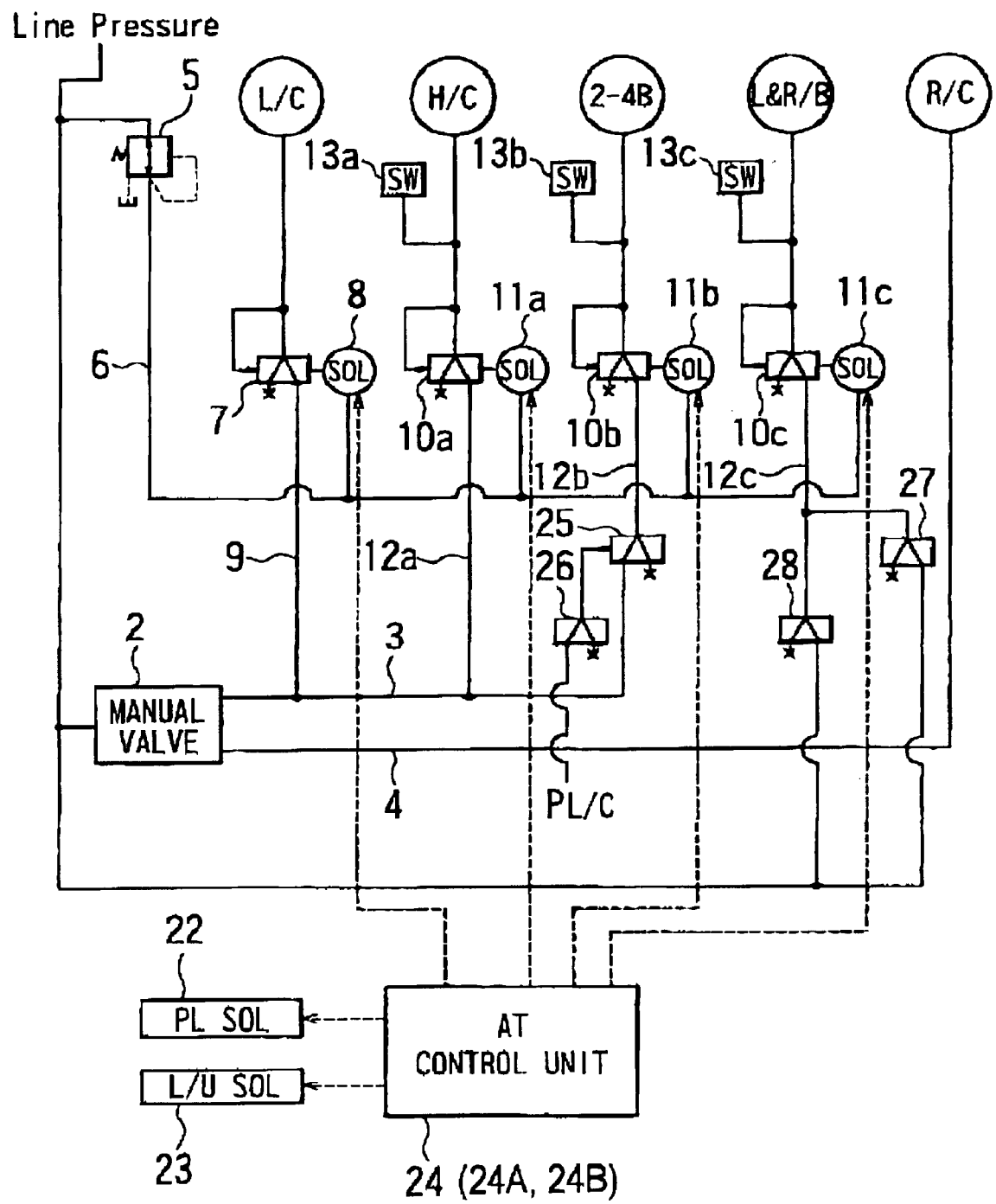
FIG. 3 is a diagram showing a hydraulic control system according to the embodiment.

FIG. 3 shows a hydraulic control system that is intended to operate the above-mentioned friction elements.

A manual valve 2 is a valve that is operated by manual selective operation. The manual valve 2 causes the line pressure to be outputted to a D-range pressure oil channel 3 in a D range, and to an R-range oil channel 4 in an R range.

A pilot valve 5 provides control to lower the line pressure to a predetermined pilot pressure, and outputs it to a pilot pressure oil channel 6.

A regulating valve 7 is disposed in a low-clutch pressure oil channel 9 extending to the low clutch L/C, and is controlled by a solenoid 8 operating in accordance with instructions from an AT control unit 24.

Oil channels 12 (12a, 12b, 12c) extending to the high clutch H/C, 2-4 brake 2-4B, and low-and-reverse brake L&R/B are respectively provided with regulating valves 10 (10a, 10b, 10c). The regulating valves 10 are respectively controlled by solenoids 11 (11a, 11b, 11c) operating in accordance with instructions from the AT control unit 24. The oil channels 12a, 12b, 12c are respectively provided with oil pressure switches 13 (13a, 13b, 13c) operating in accordance with oil pressures supplied to the corresponding clutches or brakes, i.e. a high-clutch pressure, 2-4 brake pressure, and low-and-reverse brake pressure.

A pressure control solenoid 22 controlled by the AT control unit 24 constitutes a line pressure control device. The pressure control solenoid 22 is a duty solenoid that is capable of controlling the line pressure to a desired pressure between the minimum pressure and the maximum pressure under the control of the AT control unit 24.

A lock-up duty solenoid 23 is a duty solenoid that is capable of controlling the engagement and disengagement of the lock-up clutch L/U.

A first failsafe valve 25 and a second failsafe valve 26 are provided at the input side of the regulating valve 10b of the 2-4 brake 2-4B. The first failsafe valve 25 is actuated dependently on the low-clutch pressure PL/C, which has been modified by the second failsafe valve 26, as an operating signal pressure. The second failsafe valve 26 is actuated dependently on the high-clutch pressure PH/C as an operating signal pressure.

At the third gear position at which the low-clutch pressure and the high-clutch pressure are generated at the same time, the application of the high-clutch pressure to the second failsafe valve 26 causes the low-clutch pressure to be applied to the first failsafe valve 25. Therefore, the 2-4 brake pressure is forced to be drained. A third failsafe valve 27 and a fourth failsafe valve 28 are provided at the input side of the regulating valve 10c of the low-and-reverse brake L&R/B.

The third failsafe valve 27 is actuated dependently on the high-clutch pressure PH/C as an operating signal pressure, and the fourth failsafe valve 28 is actuated dependently on the 2-4 brake pressure P2-4/B as an operating signal pressure. At the second, third, or fourth gear position at which either one or both of the high-clutch pressure PH/C and the 2-4 brake pressure 2-4B are generated, the low-and-reverse brake pressure is drained.

The AT control unit 24 includes an engagement state determining section 24A and a protection control section 24B. The engagement state determining section 24A receives switch signals indicating the state of oil pressure in the respective friction elements from the respective oil pressure switches 13 (13a, 13b, 13c). When changing gears, the AT control unit 24 outputs command signals to the respective solenoids 8, 11a, 11b, 11c via the protection control section 24B in predetermined timing. In particular, the protection control section 24B provides control such that the regulating valves for the friction elements, which have been determined as being engaged by the engagement state determining section 24A, are brought into a pressure-regulating state.

In the following description, the friction elements are represented by the "clutches".

Figure 4:
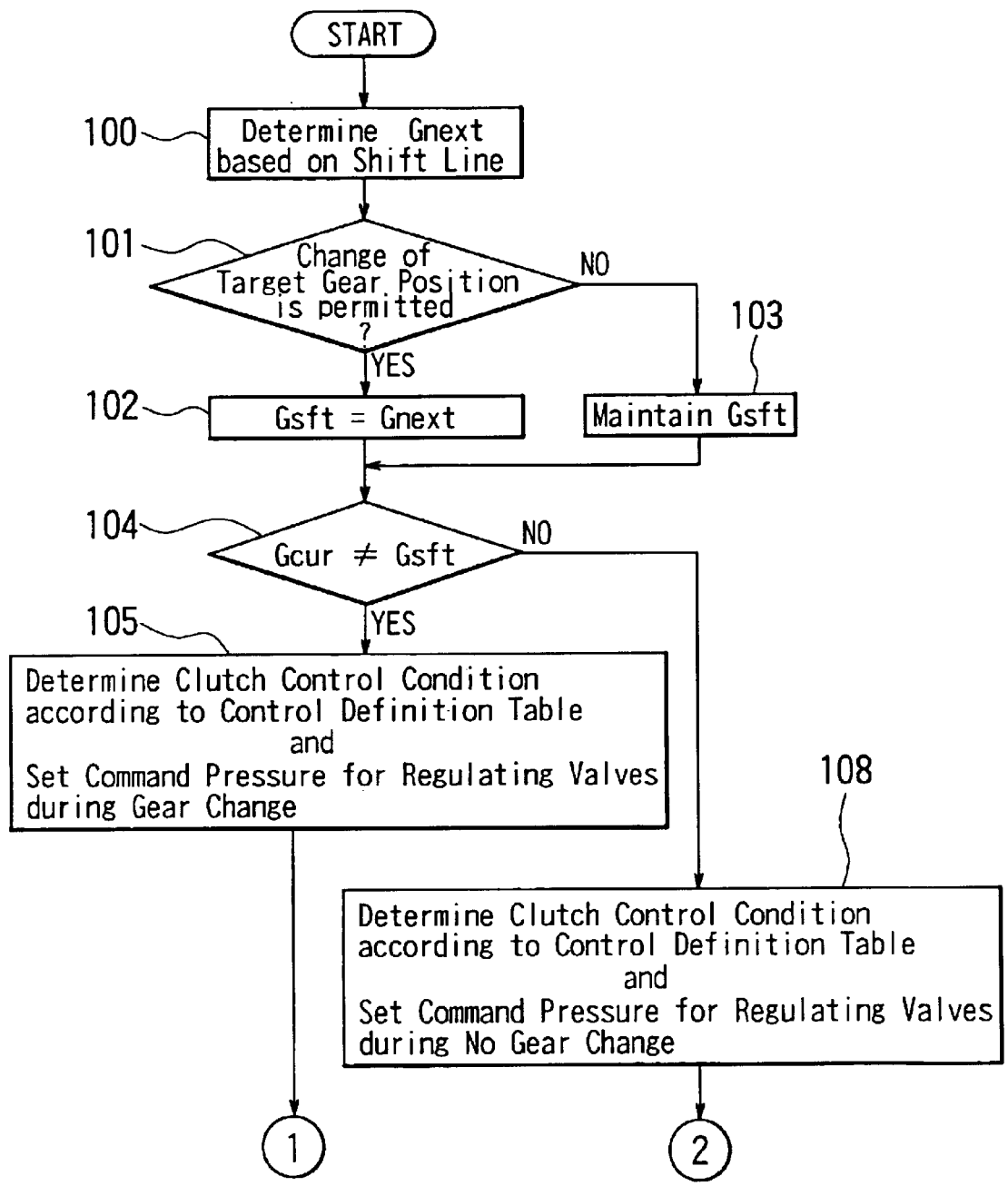
FIG. 4 is a flow chart showing the procedure for determining a gear position and making determinations as to gear positions.
Figure 5:
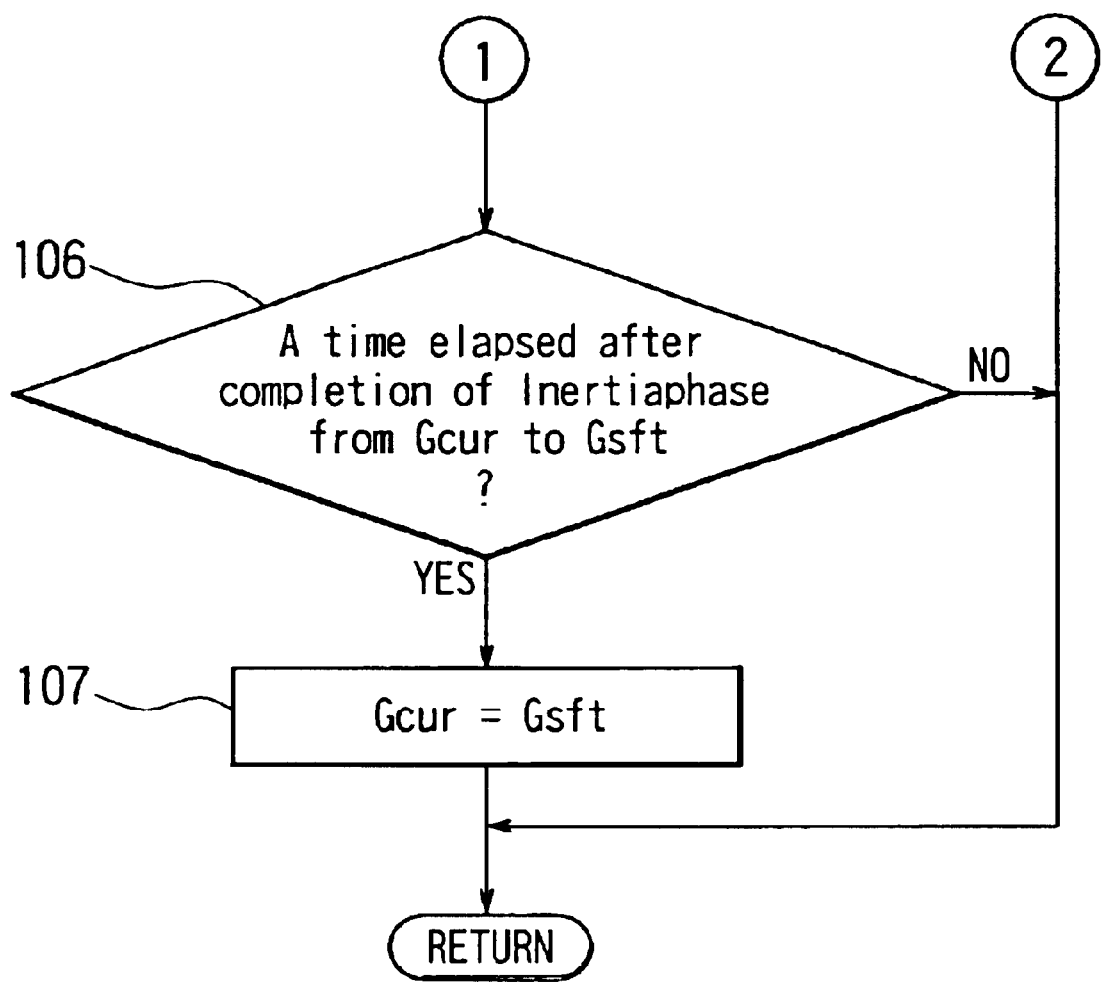
FIG. 5 is a flow chart showing a continued part of the procedure for determining a gear position and making determinations as to gear positions.

FIGS. 4 and 5 are flow charts showing the procedure for determining a gear position and making determinations as to a gear position.

First, in step 100, a gear position Gnext desired by a driver is determined based on a shift line set for the vehicle speed and the engine throttle opening, for example.

It is then determined in step 101 whether or not the target gear position is currently permitted to be changed to another gear position.

If it is determined in the step 101 that the target gear position is permitted to be changed, a value of the gear position Gnext is assigned to a target gear position Gsft as a variable in step 102.

On the other hand, if it is determined in the step 101 the target gear position is not permitted to be changed, the current value of the target gear position Gsft is maintained in step 103.

After the steps 102 and 103, it is determined in step 104 whether or not a current gear position Gcur is different from the target gear position Gsft.

If the current gear position Gcur is different from the target gear position Gsft, it is determined that gears are currently being changed, and the process proceeds to step 105. In the step 105, how the respective clutches are controlled is determined according to a clutch control definition table of FIG. 6 to set command pressures for the respective regulating valves 10.

The control definition table of FIG. 6 shows how the respective clutches are controlled at the respective current gear positions Gcur in relation to the target gear positions Gsft. This control definition table only shows the forward-driving gear positions.

In step 106, it is determined whether a predetermined period of time has elapsed after completion of an inertia phase in gear shift from the current gear position Gcur to the target gear position Gsft.

If it is determined in the step 106 that the predetermined period of time has elapsed after the completion of the inertia phase, it is determined that the gear-shift is complete. The process then proceeds to step 107 wherein a value of the target gear position Gsft is assigned to the current gear position Gcur to complete one flow of operations.

On the other hand, if it is determined in the step 106 that the predetermined period of time has not yet elapsed after the completion of the inertia phase, the flow of operations is terminated to start the next flow of operations.

If it is determined in the step 104 that the current gear position Gcur coincides with the target gear position Gsft, it is determined that gears are not being changed, and the process then proceeds to step 108. In the step 108, how the respective clutches are being controlled is determined according to the clutch control definition table of FIG. 6 to set command pressures for the respective regulating valves 10.

Figure 7:
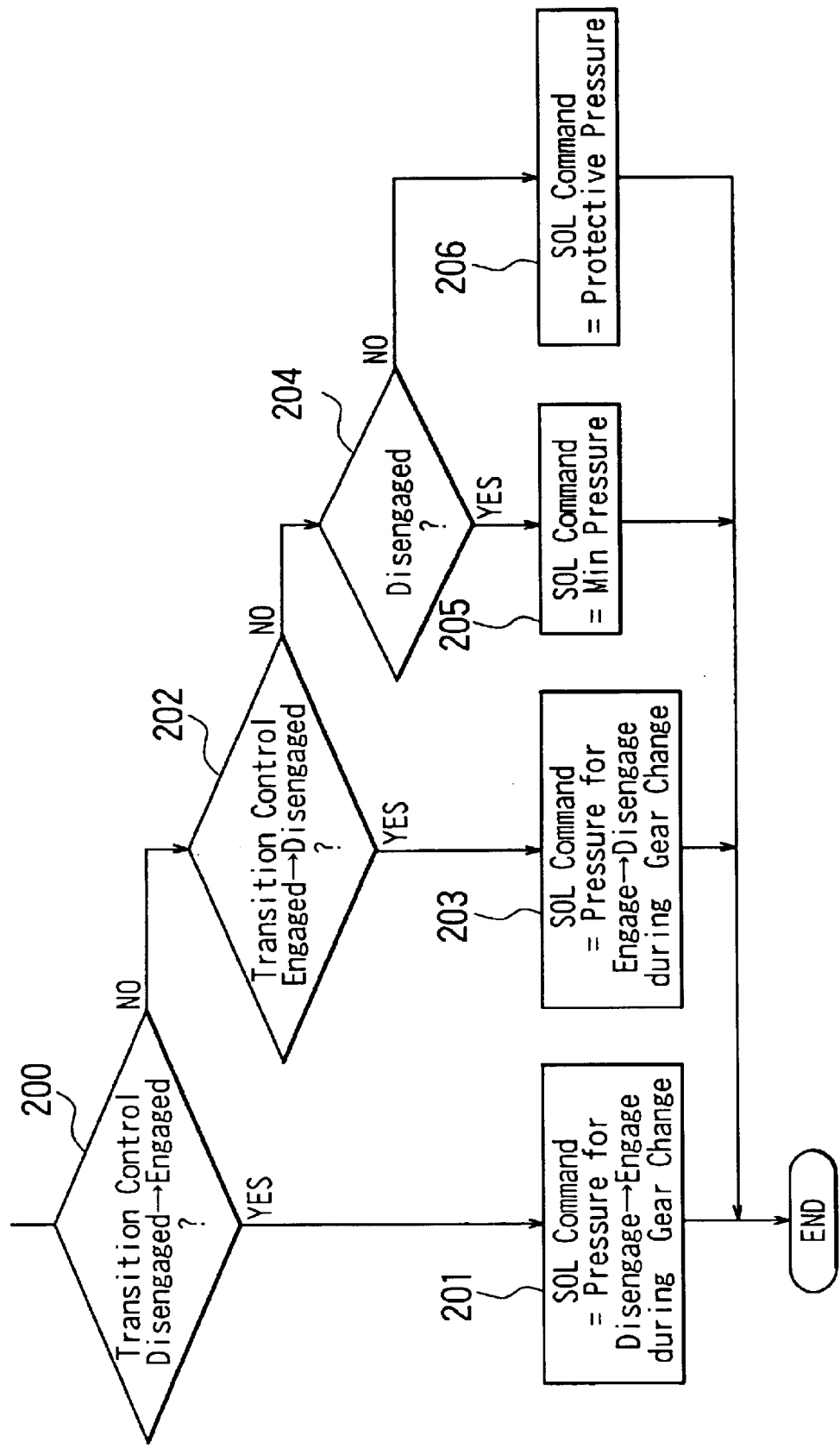
FIG. 7 is a flow chart showing the details of the procedure for setting a command pressure for a regulating valve.

FIG. 7 is a flow chart showing the details of the procedure for setting the command pressures (i.e. command pressures for the solenoids 11 that control the regulating valves) in the steps 105 and 108.

First, it is determined in step 200 whether or not the clutch is being controlled to transition from the disengaged state to the engaged state.

If it is determined in the step 200 that the clutch is controlled to transition from the disengaged state to the engaged state, the process proceeds to step 201 wherein the command pressure for the solenoid 11 is set to an oil pressure directing transition from the disengaged state to the engaged state in shift control. On this occasion, the clutch pressure during the gear shift is set to a predetermined oil pressure based on the engine torque, vehicle speed, throttle opening, and turbine revolutionary speed.

If it is determined in the step 200 that the clutch is not being controlled to transition from the disengaged state to the engaged state, the process proceeds to step 202 wherein it is determined whether or not the clutch is being controlled to transition from the engaged state to the disengaged state.

If it is determined in the step 202 that the clutch is being controlled to transition from the engaged state to the disengaged state, the process proceeds to step 203 wherein the command pressure for the solenoid 11 is set to an oil pressure directing transition from the engaged state to the disengaged state in shift control. As in the step 201, the clutch pressure during the gear shift is set to a predetermined oil pressure.

If it is determined in the step 202 that the clutch is not being controlled to transition from the engaged state to the disengaged state, the process proceeds to step 204 wherein it is determined whether the clutch is being controlled to be engaged. If it is determined in the step 204 that the clutch is being controlled to be disengaged, the process proceeds to step 205 wherein the command pressure for the solenoid 11 is set to the minimum command oil pressure.

On the other hand, if it is determined in the step 204 that the clutch is not being controlled to be disengaged, it is determined that the clutch is being controlled to be engaged. The process then proceeds to step 206 wherein the command pressure for the solenoid 11 is set to a protective oil pressure.

The protective oil pressure is set to be lower than the line pressure. For example, the protective oil pressure is set to be 0.8 to 0.9 times the line pressure by operation of the regulating valve 10.

It should be noted that during the gear shift, the process proceeds from the steps 201 and 203 to the step 106 of the main flow.

Among the above-mentioned steps, the steps 200, 202, and 204 are carried out by the engagement state determining section, and the step 206 is executed by the protection control section 24B.

Figure 8:
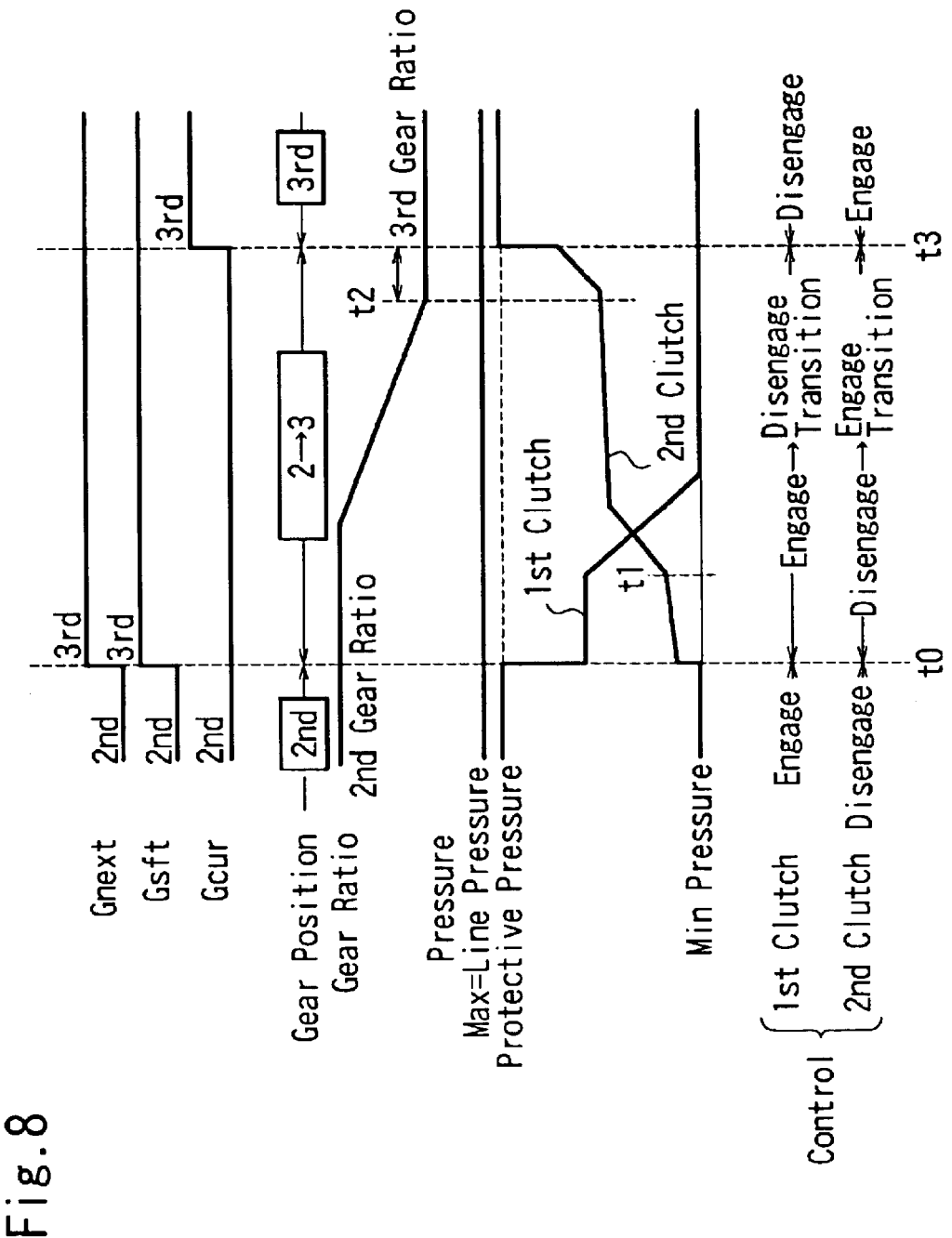
FIG. 8 is a time chart showing changes in related parameters during gear shift.

FIG. 8 is a time chart showing changes in related parameters in gear shift from the second speed to the third speed in the above-described flow of operations.

If the gear position Gnext is changed to the third speed gear position at a time t0 while the gear position is the second speed gear position (step 100), the target gear position Gsft is set to the third speed gear position as Gnext (step 102). Since the current gear position Gcur is kept at the second speed gear position and only the target gear position Gsft is changed to the third speed gear position, it is determined in the step 104 that the current gear position Gcur is different from the target gear position Gsft. The process then proceeds to the step 105 wherein the command pressure is determined.

Further, the gear positions are changed from the second speed gear position to the third speed gear position, and how the respective clutches are being controlled is determined according to the table of FIG. 6.

Consequently, the low-clutch L/C is controlled to be engaged, the 2-4 brake 2-4/B is controlled to transition from the engaged state to the disengaged state, the high clutch H/C is controlled to transition from the disengaged state to the engaged state, and the low-and-reverse brake L&R/B is controlled to be disengaged.

Therefore, in FIG. 8, the 2-4 brake 2-4/B is regarded as a first clutch that is controlled to transition from the engaged state to the disengaged state, and the high clutch H/C is regarded as a second clutch that is controlled from the disengaged state to the engaged state.

On this occasion, the oil pressure of the engaged first clutch (i.e. the 2-4 brake 2-4/B) is once reduced to a predetermined value, and the disengaged second clutch (i.e. the high clutch H/C) with the minimum oil pressure is supplied with an oil pressure regulated by the regulating valve 10a.

If the second clutch is filled with oil pressure at the time t1, the oil pressure switch 13a disposed in the oil channel of the second clutch operates in response to the detection of the filling, and the AT control unit 24 starts draining the oil pressure from the first clutch in accordance with a switch signal outputted from the oil pressure switch 13a.

Consequently, the actual gear ratio is changed, and when the gear ratio of the third speed gear position is reached at a time t2 to complete the inertia phase, the shift control is terminated at a time t3 that is a predetermined period of time after the time t2.

After the completion of the inertia phase, the clutch pressure of the second clutch engaged by the gear shift is rapidly raised to hold the second clutch in the engaged state after the gear shift.

Upon completion of the gear shift, a value of the target gear position Gsft as the third speed gear position is assigned to the current gear position Gcur. Thus, the current gear position is equal to the target gear position as the third speed gear position. In the next control timing, the process proceeds from the step 104 to the step 108 wherein a command pressure while gears are not changed is determined.

The first clutch (i.e. the 2-4 brake 2-4/B) is controlled to transition from the engaged state to the disengaged state for gear shift from the time t0 to the time t3, and the second clutch (i.e. the high clutch H/C) is controlled to transition from the disengaged state to the engaged state from the time t0 to the time t3.

As shown in the time chart of FIG. 8, while the clutches are controlled to be engaged before they are controlled to transition from the engaged state to the disengaged state and after they are controlled to transition from the disengaged state to the engaged state, the clutch oil pressures are set to protective oil pressures lower than the maximum pressure (=line pressure) based on the maximum command oil pressure.

Although not illustrated in FIG. 8, as is clear from the table of FIG. 6, the clutch oil pressure of the low clutch L/C, which is controlled to be engaged in the second speed gear position before the gear shift from the second to third speed, during the gear shift from the second to the third speed, and in the third speed gear position after the gear shift from the second to third speed, is also set to the protective oil pressure.

This also applies to gear shift between the other gear positions, and the other friction elements.

Figure 9A:
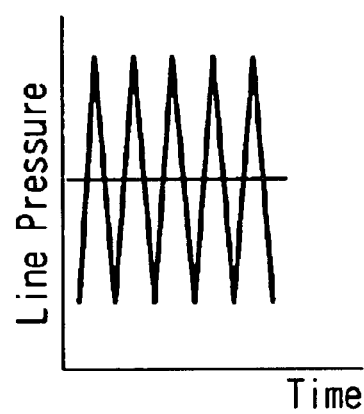
FIGS. 9A and 9B are graphs useful in explaining the comparison in hydraulic vibration reducing effects.
Figure 9B:
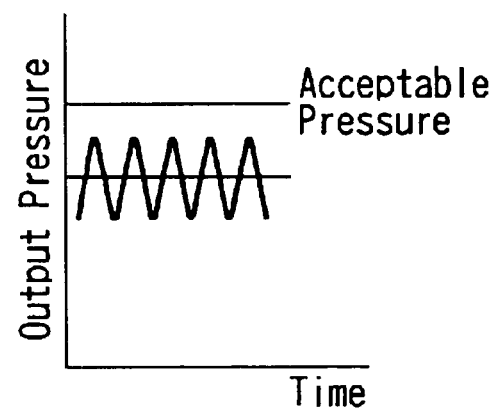
Figure 12A:
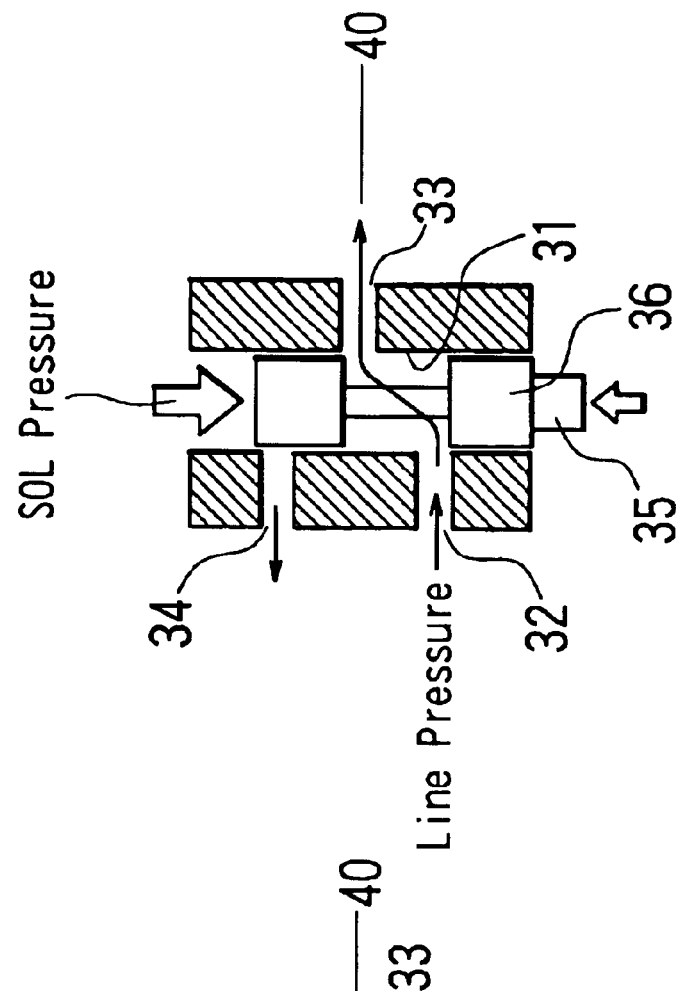
FIGS. 12A and 12B are diagrams showing the basic construction of a regulating valve according to the prior art.
Figure 12B:
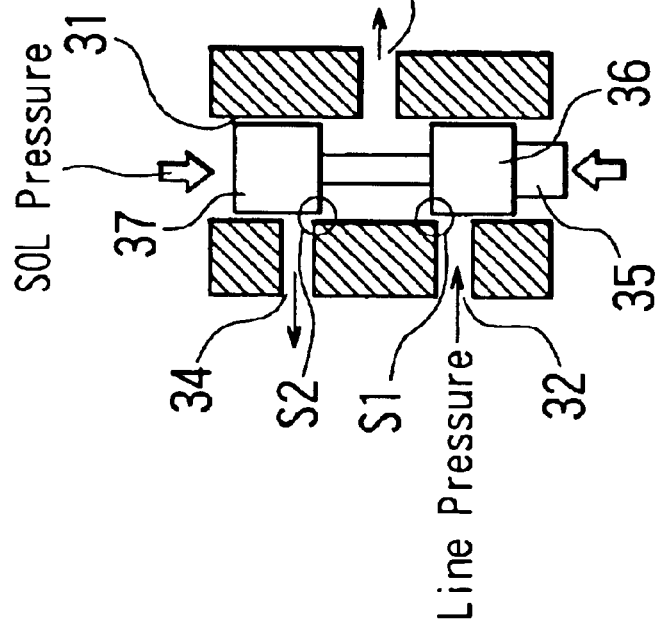

According to the above-described embodiment, since the command pressure is determined such that the clutch pressure is set to the protective oil pressure lower than the line pressure while the clutch is controlled to be held in the engaged state, the lands of the spool form the apertures between the input port and the output port of the regulating valve 10 in the pressure-regulating state as shown in FIG. 12A. As a result, the clutch pressure is regulated to the protective oil pressure slightly lower than the line pressure, and even if great hydraulic vibration is applied to the line pressure as shown in FIG. 9A, the transmission of the hydraulic vibration to the output port is considerably limited to make smaller the highest value of oil pressure oscillation in the oil channel 12 between the regulating valve 10 and the clutch as shown in FIG. 9B.

Further, according to the above-described embodiment, since the regulating valve has the spool that forms the apertures for limiting the line pressure in the pressure-regulating state, the apertures can be easily formed by stroking the spool and the hydraulic vibration can be easily reduced.

Further, since the pressure acceptable by the oil pressure switch is usually determined to allow a small margin for the line pressure, and therefore, decreasing the hydraulic vibration can make smaller the maximum value of the hydraulic vibration than the pressure acceptable by the oil pressure switch. This improves the durability of the oil pressure switch 13.

It should be noted that the protective oil pressure never inhibits the clutch from being held in the engaged state since it is only slightly lower than the line pressure.

Although in the above-described embodiment, the clutch pressure is constantly set to the protective oil pressure while the clutch is controlled to be held in the engaged state, this is not limitative, but the clutch pressure may be set to the protective oil pressure only in the case where the hydraulic vibration applied to the line pressure is assumed to be great.

Figure 10:
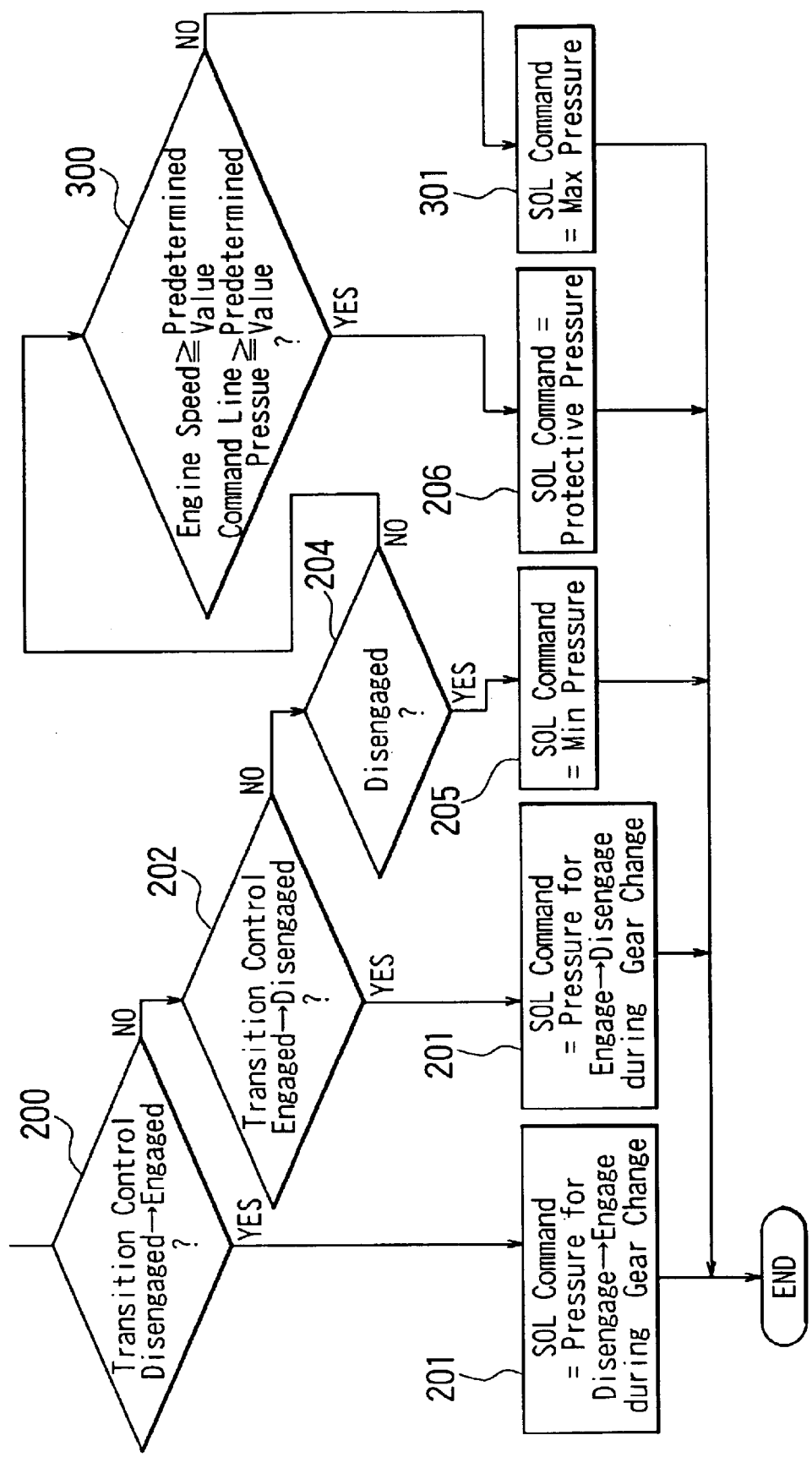
FIG. 10 is a flow chart showing the procedure for setting a command pressure for a regulating valve according to a variation of the embodiment.
Figure 11:
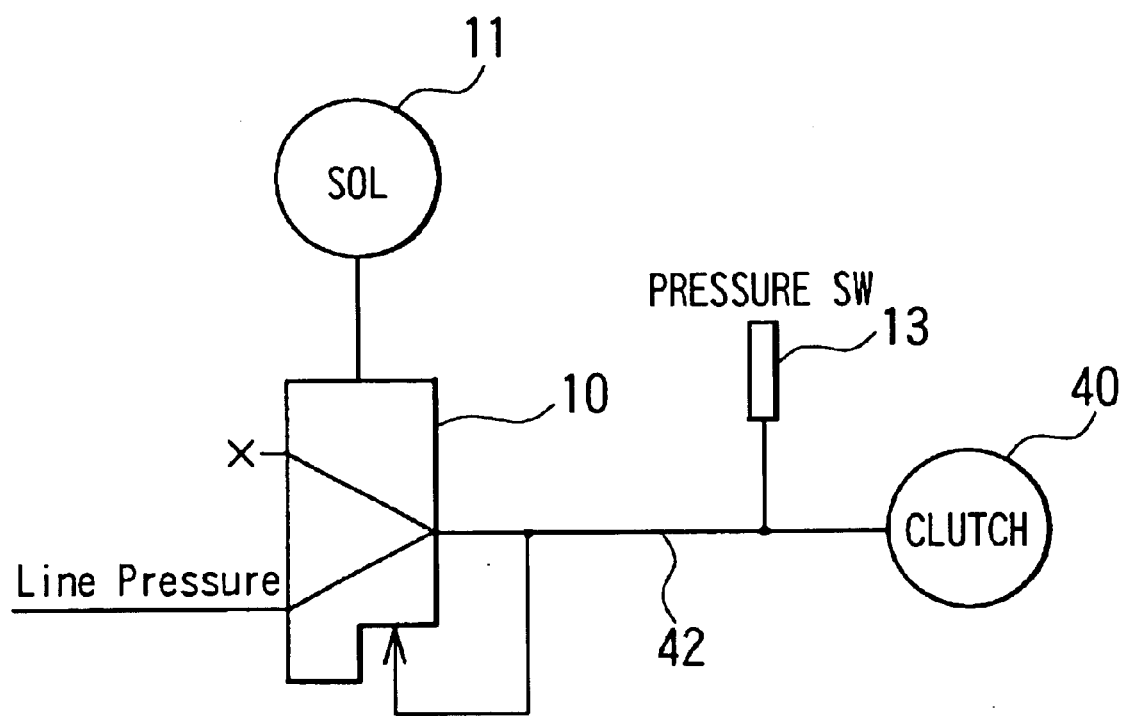
FIG. 11 is a diagram showing an example in which an oil pressure is supplied to a clutch according to a prior art.

FIG. 10 is a flow chart showing the procedure for setting command pressures for the respective regulating. valves 10 according to a variation of the above-described embodiment. Step 300 is provided between the step 204 and the step 206 in the flow chart of FIG. 7.

If it is determined in the step 204 that the clutch is not being controlled to be disengaged, it is determined that the clutch is being controlled to be engaged. The process then proceeds to the step 300 wherein it is determined whether or not the engine speed is equal to or higher than a predetermined value and a pressure control solenoid 22 controls the line pressure to be equal to or higher than a predetermined value.

If it is determined in the step 300 that the engine speed and the line pressure are equal to or higher than the predetermined values, the hydraulic vibration is assumed to be great. Thus, in the step 206, the command pressure for the solenoid 11 is set to the protective oil pressure. On the other hand, if the engine speed is smaller than the predetermined value or the line pressure is smaller than the predetermined value, the process proceeds to step 301 wherein the command pressure for the solenoid 11 is set to the maximum command pressure and the line pressure is directly supplied to the clutch.

This enables precise control according to the assumed hydraulic vibration.

If the regulating valve continues to regulate the oil pressure to intermediate pressure, this causes adverse effects such as deterioration of the solenoid durability, increase in noise of the solenoids, and increase in current consumed by the solenoids. According to the above-described embodiment, however, the regulating valve regulates the oil pressure only in the case where the hydraulic vibration is assumed to be great, the adverse effects can be reduced to the minimum to improve the durability of the oil pressure switches 13.

Although the description of the above-described embodiment is made based upon the example in which the SOL command pressure is set to the protective oil pressure when gears are not changed, this is not limitative, but it goes without saying that even when the gears are changed, the SOL command pressure may be set to the protective oil pressure with respect to the friction element that is held in the engaged state during the gear shift (i.e. the low clutch during the gear shift from the second to third speed according to the above-described embodiment).

Although in the regulating valve 10 shown in FIG. 12A, the lands 36 and 37 of the spool 35 lap and close the input port 32 and 34 in the pressure-regulating state, the space between the lands 36 and 37 may be set larger so that the lands 36 and 37 do not close the input port 32 and 34 fully in the pressure-regulating state. However, the feature as shown in FIG. 12A is recommended for higher effectiveness.

What is claimed is:

1. A hydraulic control device for an automatic transmission that comprises a plurality of rotational elements and a plurality of hydraulically actuated friction elements to achieve a plurality of gear positions by engaging or disengaging the friction elements in predetermined combinations, and comprises oil pressure switches, which output signals indicating the level of oil pressure, in oil supply channels of predetermined friction elements to which is supplied a line pressure via regulating valves, said hydraulic control device comprising:

an engagement state determining section that determines whether respective ones of the friction elements are being controlled to be engaged; and a protection control section that brings the corresponding regulating valves into a pressure regulating state such that an output from the regulating valves of the friction elements determined as being controlled to be engaged among the predetermined friction elements having the oil pressure switches is kept lower than the line pressure.

2. A hydraulic control device for an automatic transmission according to claim 1, wherein when the friction elements are held in an engaged state, said protection control section provides control such that the output from the regulating valves for the friction elements is kept lower than the line pressure while the line pressure is controlled to be equal to or higher than a predetermined value.

3. A hydraulic control device for an automatic transmission according to claim 1, wherein when the friction elements are held in an engaged state, said protection control section provides control such that the output from the regulating valves for the friction elements is kept lower than the line pressure while an engine speed is equal to or higher than a predetermined value.

4. A hydraulic control device for an automatic transmission according to claim 1, 2 or 3, wherein the regulating valves each comprise a spool that limits the line pressure in the pressure-regulating state.

5. A hydraulic control device for an automatic transmission according to claim 2, wherein when the friction elements are held in an engaged state, said protection control section provides control such that the output from the regulating valves for the friction elements is kept lower than the line pressure while an engine speed is equal to or higher than a predetermined value.

6. A hydraulic control device for an automatic transmission according to claim 5, wherein the regulating valves each comprise a spool that limits the line pressure in the pressure-regulating state.

7. A hydraulic control device for an automatic transmission having a plurality of rotational elements and a plurality of hydraulically actuated friction elements to achieve a plurality of gear positions by engaging or disengaging the friction elements in predetermined combinations, said hydraulic control device comprising:

a regulating valve associated with each of a predetermined number of said friction elements for supplying a line pressure thereto;

an oil pressure switch associated with each of the predetermined friction element for outputting a signal indicating the level of oil pressure in the respective predetermined friction element;

an engagement stare determining means for determining whether any of the friction elements are being controlled to be engaged; and a protection control means for controlling the respective regulating valves so that the pressure supplied to the predetermined friction elements determined as being controlled to be engaged is kept below the line pressure.

* * * * *